United States Patent
Rodman et al.

(10) Patent No.: US 8,196,392 B2
(45) Date of Patent: Jun. 12, 2012

(54) EXHAUST SYSTEM HAVING REGENERATION TEMPERATURE CONTROL STRATEGY

(75) Inventors: Anthony Clark Rodman, Chillicothe, IL (US); Cornelius Nicolae Opris, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1020 days.

(21) Appl. No.: 12/155,194

(22) Filed: May 30, 2008

(65) Prior Publication Data
US 2009/0293456 A1    Dec. 3, 2009

(51) Int. Cl.
*F01N 3/00* (2006.01)
(52) U.S. Cl. ............................................. 60/295; 60/311
(58) Field of Classification Search .................... 60/286, 60/295, 297, 311
See application file for complete search history.

(56) References Cited

U.S. PATENT DOCUMENTS

| | | | |
|---|---|---|---|
| 7,299,626 B2 * | 11/2007 | Barasa et al. ................... | 60/297 |
| 7,478,553 B2 * | 1/2009 | Higuchi ..................... | 73/114.73 |
| 7,877,985 B2 * | 2/2011 | Hashizume ..................... | 60/292 |
| 2001/0010151 A1 * | 8/2001 | Russell ........................... | 60/286 |
| 2003/0145581 A1 | 8/2003 | Tashiro et al. | |
| 2004/0031262 A1 * | 2/2004 | Gui et al. ........................ | 60/285 |
| 2004/0123741 A1 * | 7/2004 | Ohtake et al. ................... | 96/420 |
| 2004/0139733 A1 * | 7/2004 | Koga et al. ..................... | 60/280 |
| 2004/0194450 A1 * | 10/2004 | Tanaka et al. ................... | 60/285 |
| 2005/0000209 A1 * | 1/2005 | Takahashi et al. .............. | 60/286 |
| 2005/0126161 A1 * | 6/2005 | Otake et al. ..................... | 60/277 |
| 2005/0137776 A1 * | 6/2005 | Gioannini et al. ............. | 701/101 |
| 2005/0138921 A1 * | 6/2005 | Hashimoto et al. ............. | 60/297 |
| 2005/0150221 A1 | 7/2005 | Crawley et al. | |
| 2005/0241301 A1 * | 11/2005 | Okugawa et al. ............... | 60/295 |
| 2005/0284138 A1 | 12/2005 | Imai et al. | |
| 2006/0096280 A1 | 5/2006 | Zhan et al. | |
| 2006/0120937 A1 * | 6/2006 | Zuberi ........................ | 423/215.5 |
| 2006/0130468 A1 | 6/2006 | Sun et al. | |
| 2006/0168947 A1 | 8/2006 | Durnholz et al. | |
| 2006/0236680 A1 | 10/2006 | Zhang et al. | |
| 2007/0012034 A1 | 1/2007 | Yahata et al. | |
| 2007/0044455 A1 * | 3/2007 | Barasa et al. ................... | 60/295 |
| 2007/0056274 A1 * | 3/2007 | Wills ............................... | 60/297 |
| 2007/0101702 A1 | 5/2007 | Saito | |
| 2007/0130923 A1 * | 6/2007 | Dye et al. ........................ | 60/295 |
| 2007/0256408 A1 * | 11/2007 | Kogo et al. ..................... | 60/286 |
| 2007/0266701 A1 | 11/2007 | Cheng | |
| 2008/0010971 A1 * | 1/2008 | Gioannini et al. .............. | 60/274 |
| 2008/0047257 A1 | 2/2008 | Ament et al. | |

\* cited by examiner

*Primary Examiner* — Thomas Denion
*Assistant Examiner* — Patrick Maines
(74) *Attorney, Agent, or Firm* — Finnegan, Henderson, Farabow, Garrett & Dunner LLP

(57) ABSTRACT

An exhaust system for use with a combustion engine is disclosed. The exhaust system may have an exhaust passage configured to receive a flow of exhaust from the combustion engine, a particulate filter located within the exhaust passage, and a heating device located to selectively warm the flow of exhaust passing through the particulate filter. The exhaust system may also have a controller in communication with the combustion engine and the heating device. The controller may be configured to continuously determine an amount of particulate matter within the particulate filter, continuously determine a desired regeneration temperature based on the amount of particulate matter, and continuously determine an error value as a function of the desired regeneration temperature and an actual regeneration temperature. The controller may be further configured to determine an amount of particulate matter within the particulate filter, and adjust an amount of warming provided by the heating device based on the error value.

20 Claims, 2 Drawing Sheets

EXHAUST SYSTEM HAVING REGENERATION TEMPERATURE CONTROL STRATEGY

TECHNICAL FIELD

The present disclosure relates generally to an exhaust system and, more particularly, to an exhaust system that has a regeneration temperature control strategy.

BACKGROUND

Particulate filters are utilized to remove particulate matter from an engine's exhaust flow. After an extended period of use, however, the particulate filter can become saturated with particulate matter, thereby reducing the flow of exhaust through the filter and subsequent engine performance. The collected particulate matter can be removed from the particulate filter through a process called regeneration.

Regeneration is the burning away of trapped particulate matter at high temperatures, typically in excess of 600° C. These temperatures can be periodically achieved through engine control, electric grids, fuel-fired burners, or other regeneration devices located at or upstream of the filter to heat the exhaust flowing through the filter. A rate of regeneration and a regeneration temperature resulting from combustion of the particulate matter can be dependent on multiple variables, including an amount of particulate matter accumulated within the filter at the time of regeneration, a temperature of the exhaust passing through the filter, and an amount of oxygen available for combustion during regeneration. For example, for a greater amount of collected particulate matter, a higher exhaust temperature, and a higher concentration of oxygen available during regeneration, regeneration will occur at a faster rate and attain higher combustion temperatures than if less particulate matter, a lower exhaust temperature, or less oxygen is present. In some situations, care should be taken such that a rate of filter heating and a maximum combustion temperature achieved during regeneration does not cause damage to the filter.

One attempt at controlling regeneration rates and temperatures is disclosed by U.S. Patent Publication No. 2008/0010971 (the '971 publication) by Gioannini et al., published on Jan. 17, 2008. The '971 publication discloses a method for managing regeneration of a diesel particulate filter for a gas exhaust system of an internal combustion engine. The method includes monitoring a soot loading of the particulate filter and, when the soot loading exceeds a threshold level, initiating regeneration at a first rate. When regenerating at the first rate, a target temperature within the particulate filter and an oxygen flow to the filter are controlled to slow the rate of regeneration. The target temperature during the first rate is 600° C., and an allowed oxygen flow rate is any value lower than 7%. The regeneration duration at the first rate is based on a driving profile of the associated machine, with a maximum limit of 400 seconds. The regeneration temperatures are controlled by way of selective post fuel injections within the internal combustion engine.

After the amount of particulate matter remaining within the filter has been sufficiently reduced during regeneration at the first rate or the maximum duration limit has been exceeded, the method includes initiating regeneration at a second rate that is faster than the first rate. When regenerating at the second rate, the target temperature within the particulate filter is 650° C., and the allowed oxygen flow rate is a maximum concentration that can physically be obtained. The regeneration duration at the second rate is also based on a driving profile of the associated machine, with a maximum limit of 200 seconds.

By limiting the rate of regeneration when there is a large amount of particulate matter trapped within the filter, the maximum temperatures resulting from combustion of the trapped particulate matter can be maintained at a level that does not damage the filter. And, when the amount of particulate matter contained within the filter has sufficiently been reduced, the rate of regeneration and the resulting temperatures can be safely increased to speed up the regeneration process without causing damage to the filter.

The method of the '971 publication may lack efficiency. Specifically, the particulate matter contained within the filter reduces in a substantially exponential manner during regeneration. As such, toward the end of regenerating at the first rate, enough of the particulate matter may have been reduced that a higher rate of regeneration could have been safely implemented before regeneration at the second rate has begun. Thus, a regeneration method that varies temperature and/or oxygen control in a step-wise manner may result in unnecessarily long regeneration durations at slow rates. And, longer regeneration durations may require more power to sustain, thereby increasing operational costs of the associated internal combustion engine.

The disclosed exhaust system is directed toward overcoming one or more of the problems set forth above and/or other problems in the art.

SUMMARY

One aspect of the present disclosure is directed to an exhaust system for use with a combustion engine. The exhaust system may include an exhaust passage configured to receive a flow of exhaust from the combustion engine, a particulate filter located within the exhaust passage, and a heating device located to selectively warm the flow of exhaust passing through the particulate filter. The exhaust system may also include a controller in communication with the combustion engine and the heating device. The controller may be configured to continuously determine an amount of particulate matter within the particulate filter, continuously determine a desired regeneration temperature based on the amount of particulate matter, and continuously determine an error value as a function of the desired regeneration temperature and an actual regeneration temperature. The controller may be further configured to determine an amount of particulate matter within the particulate filter, and adjust an amount of warming provided by the heating device based on the error value Another aspect of the present disclosure is directed to a method of treating exhaust from a combustion engine. The method may include collecting particulate matter from the exhaust, heating the collected particulate matter to initiate combustion of the particulate matter, continuously determining an amount of remaining particulate matter, and continuously determining a desired combustion temperature based on the amount of remaining particulate matter. The method may further include continuously determining an error value as a function of the desired combustion temperature and an actual combustion temperature, and adjusting the heating of the collected particulate matter based on the error value.

DETAILED DESCRIPTION

Figure 1:
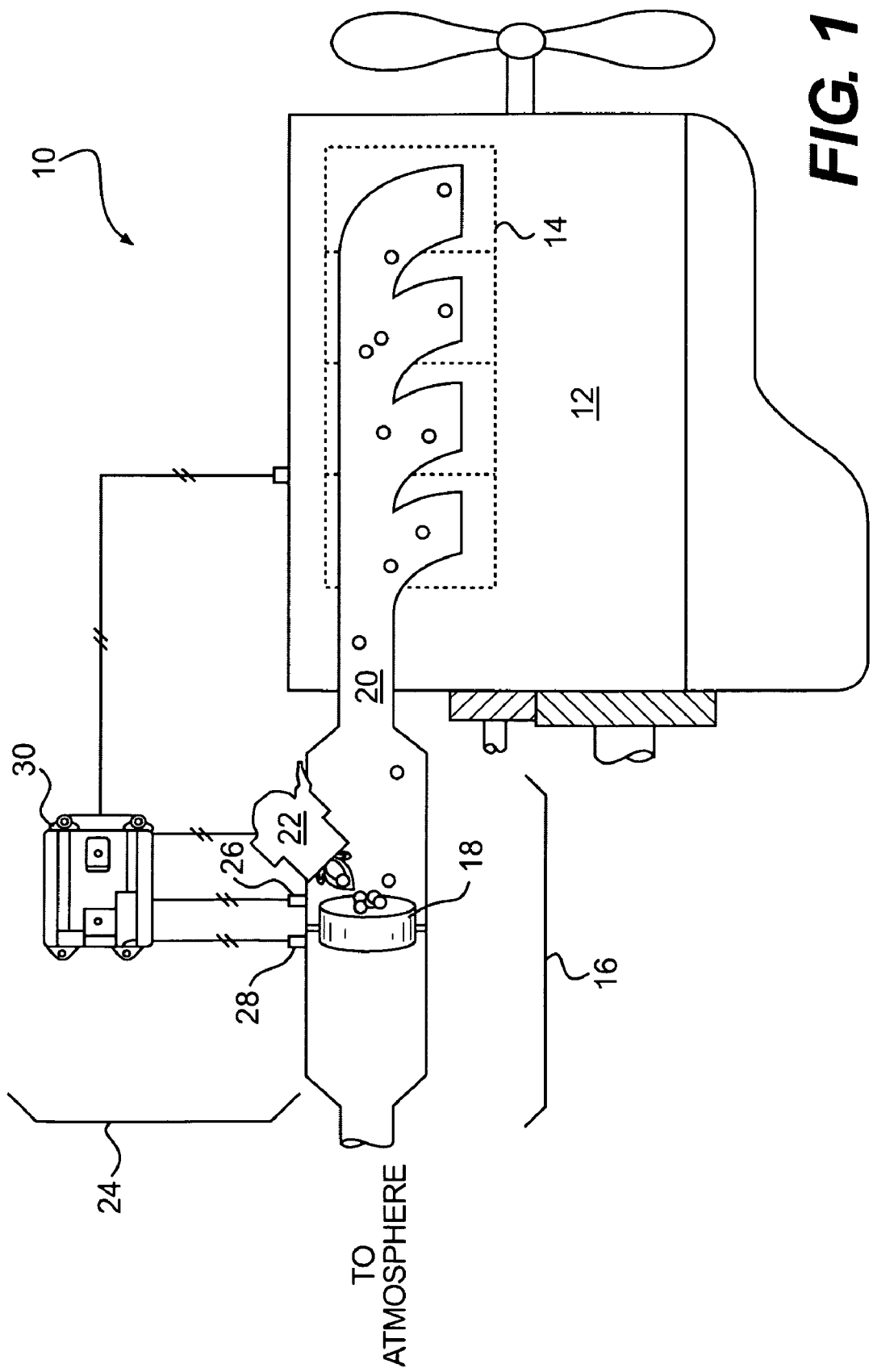
FIG. 1 is a diagrammatic illustration of an exemplary disclosed power system.

FIG. 1 illustrates an exemplary power system 10. For the purposes of this disclosure, power system 10 is depicted and described as a diesel-fueled, internal combustion engine. However, it is contemplated that power system 10 may embody any other type of combustion engine such as, for example, a gasoline or a gaseous fuel-powered engine. Power system 10 may include an engine block 12 that at least partially defines a plurality of cylinders 14. It is contemplated that power system 10 may include any number of cylinders 14 and that cylinders 14 may be disposed in an "in-line" configuration, a "V" configuration, or any other conventional configuration.

An exhaust system 16 may be associated with power system 10, and include components that condition and direct exhaust from cylinders 14 to the atmosphere. For example, exhaust system 16 may include a treatment device 18 disposed within an exhaust passage 20, and a heating device 22 located upstream of treatment device 18 to warm treatment device 18 (i.e., to either directly warm treatment device 18 or to warm exhaust passing through treatment device 18). It is contemplated that exhaust system 16 may include different or additional components than described above such as, for example, one or more catalysts, energy extraction devices, bypass components, braking devices, attenuation devices, additional treatment devices, and other known components.

Treatment device 18 may be configured to remove and collect constituents of the exhaust from power system 10. In one example, treatment device 18 may embody a particulate filter. As a particulate filter, treatment device 18 may be designed to trap particulate matter within a wire mesh or ceramic honeycomb filtration medium. As the flow of exhaust from power system 10 passes through the filtration medium, particulate matter, for example unburned hydrocarbons, may impinge against and be blocked by the filtration medium. Over time, the particulate matter may build up within treatment device 18 and the filtration medium may become saturated. If unaccounted for, this buildup of matter could reduce exhaust flow through the filtration medium and subsequent engine performance.

Heating device 22 may be situated to selectively promote regeneration of treatment device 18. Heating device 22 may embody, for example, a fuel-fired burner configured to selectively heat the exhaust flowing through treatment device 18 by injecting fuel into the flow of exhaust, and igniting the injected fuel to create a flame jet in thermal transfer with the flow of exhaust. It is contemplated, however, that heating device 22 may alternatively embody a different type of device such as an electric grid or an engine control strategy that selectively heats the exhaust, if desired. As heated exhaust flows through treatment device 18, a part or all of the particulate matter trapped therein may undergo an exothermic reaction and be reduced. This process may be know active regeneration, as the temperature of the exhaust may be artificially raised to initiate and/or maintain combustion of the trapped particulate matter. In this configuration, the amount of heat added to the exhaust by heating device 22 may directly correspond to a rate of particulate matter combustion and/or to a maximum combustion temperature attained during regeneration.

Combustion of the trapped particulate matter during regeneration can be affected by additional parameters, including an amount of trapped particulate matter and an amount of oxygen within the flow of exhaust passing through treatment device 18. In particular, regeneration combustion parameters such as a rate of filtration medium heating, and a maximum temperature of the filtration medium can be influenced by the amount of trapped particulate matter at the time of regeneration, and the concentration of oxygen with the exhaust flow. If regeneration is initiated when treatment device 18 is completely saturated and a high concentration of oxygen is available for the combustion process, the rate of filtration medium heating and the temperature of the filtration medium can be excessive, and damage of the filtration medium may be possible. In order to minimize the likelihood of damage to the filtration medium, care should be taken to limit operation of heating device 22 based on the amount of particulate matter trapped within treatment device 18 and based on the amount of oxygen available for combustion. In one example, operation of heating device 22 should be limited by an allowable heating rate or heating distribution of treatment device 18, for example a rate or distribution of about 200-300° C./cm. In another example, operation of heating device 22 should be limited by a maximum allowable temperature of treatment device 18, for example a maximum temperature of about 900° C. As long as regeneration combustion parameters can be maintained within one or both of these thermal limits, the integrity of treatment device 18 should remain intact. And, as the regeneration parameters approach the rate and temperature limits of the filtration medium, the time duration required to completely regenerate treatment device 18 may be reduced. Thus, it may be desirable to control heating device 22 such that the regeneration parameters approach the filtration medium's thermal limits, without exceeding them.

A control system 24 may be associated with power system 10 and include components that cooperate to regulate the operation of heating device 22. Specifically, control system 24 may include a first sensor 26 configured to determine a soot loading of treatment device 18, a second sensor 28 configured to determine an operational condition of power system 10, and a controller 30 in communication with first and second sensors 26, 28 and with heating device 22. Controller 30 may be configured to control operation of heating device 22 in response to input received from first and second sensors 26, 28.

First sensor 26 may embody any type of sensor utilized to determine an amount of particulate buildup within treatment device 18. For example, first sensor 26 may embody a pressure sensor or pair of pressure sensors, a temperature sensor, an RF sensor, or any other type of sensor known in the art. First sensor 26 may generate a signal directed to controller 30 indicative of the particulate buildup within treatment device 18.

It is contemplated that first sensor 26 may alternatively embody a virtual sensor. A virtual sensor may produce a model-driven estimate based on one or more known or sensed operational parameters of power system 10. For example, based on a known operating speed, load, temperature, boost pressure, ambient conditions (humidity, pressure, temperature), exhaust flow rate, and/or other parameter of power system 10, a model may be referenced to determine an amount of particulate matter produced by and or a production rate of power system 10. Similarly, based on known or estimated oxygen concentrations within the exhaust of power system 10, a temperature of treatment device 18 or of the exhaust passing through treatment device 18, and/or the flow rate of exhaust exiting power system 10, the model may be referenced to determine an amount of particulate matter reduced within and/or a reduction rate of treatment device 18 (i.e., an oxidation rate of the trapped particulate matter).

Based on the amount of particulate matter produced by and/or production rate of power system 10, and based on the amount of particulate matter reduced within and/or the reduction rate of treatment device 18, an amount of particulate matter remaining within treatment device 18 at any point of time may be determined. Thus, the signal(s) directed from sensor 26 to controller 30 may be based on calculated and/or estimated values rather than direct measurements, if desired. It is contemplated that, rather than a separate element, these virtual sensing functions may alternatively be accomplished by controller 30, if desired.

Second sensor 28 may embody any type of sensor configured to monitor an operational condition of power system 10. In one example, second sensor 28 may be a temperature sensor associated treatment device 18. In another example, second sensor 28 may be a constituent sensor configured to monitor an oxygen concentration of the exhaust from power system 10, a flow rate sensor associated with the output of power system 10, or another type of sensor configured to monitor an operational condition of power system 10. It is contemplated that multiple sensors may be included to monitor each of the operational conditions described above, if desired. Second sensor 28 may generate a signal indicative of the operational condition (i.e., of the temperature of treatment device 18 and/or of exhaust passing through treatment device 18, the oxygen concentration, or the exhaust flow rate), and direct this signal to controller 30. Controller 30 may then use this signal as input to the virtual sensing function of first sensor 26 described above. It is further contemplated that second sensor 28, similar to first sensor 26, may also be a virtual sensor, if desired.

Controller 30 may embody a single microprocessor or multiple microprocessors that include a means for controlling an operation of heating device 22 in response to signals received from first and second sensors 26, 28. Numerous commercially available microprocessors can be configured to perform the functions of controller 30. It should be appreciated that controller 30 could readily embody a general power system microprocessor capable of controlling numerous power system functions and modes of operation. Various other known circuits may be associated with controller 30, including power supply circuitry, signal-conditioning circuitry, solenoid driver circuitry, communication circuitry, and other appropriate circuitry.

One or more models and/or maps relating the particulate buildup of treatment device 18 to an adjustment of heating device 22 may be stored in the memory of controller 30. Each of these models and maps may include a collection of data in the form of tables, graphs, algorithms, and/or equations. In one example, an oxidation model may be used to predict a particulate matter oxidation rate and resulting combustion temperature during regeneration based on the particulate matter buildup within treatment device 18 from first sensor 26, and based on a worst case exhaust oxygen concentration scenario (i.e., based on a maximum oxygen concentration possible within the exhaust from power system 10) and based on a probability of the worst case scenario occurring. In another example, a map may be used to determine a desired regeneration exhaust temperature that will initiate and/or maintain the predicted particulate matter oxidation rate and resulting combustion temperature below the allowable heating rate and maximum temperature of treatment device 18. In yet another example, a map may be used to determine an adjustment to heating device 22 (i.e., a fuel injection adjustment) based on a difference between the desired regeneration exhaust temperature and an actual exhaust temperature measured by second sensor 28. Controller 30 may be configured to allow the operator of power system 10 to directly modify these models and maps and/or to select specific models and maps from available models and relationship maps stored in the memory of controller 30 to affect operation of heating device 22. It is contemplated that the models and maps may additionally or alternatively be automatically selectable based on modes of power system operation, if desired.

Figure 2:
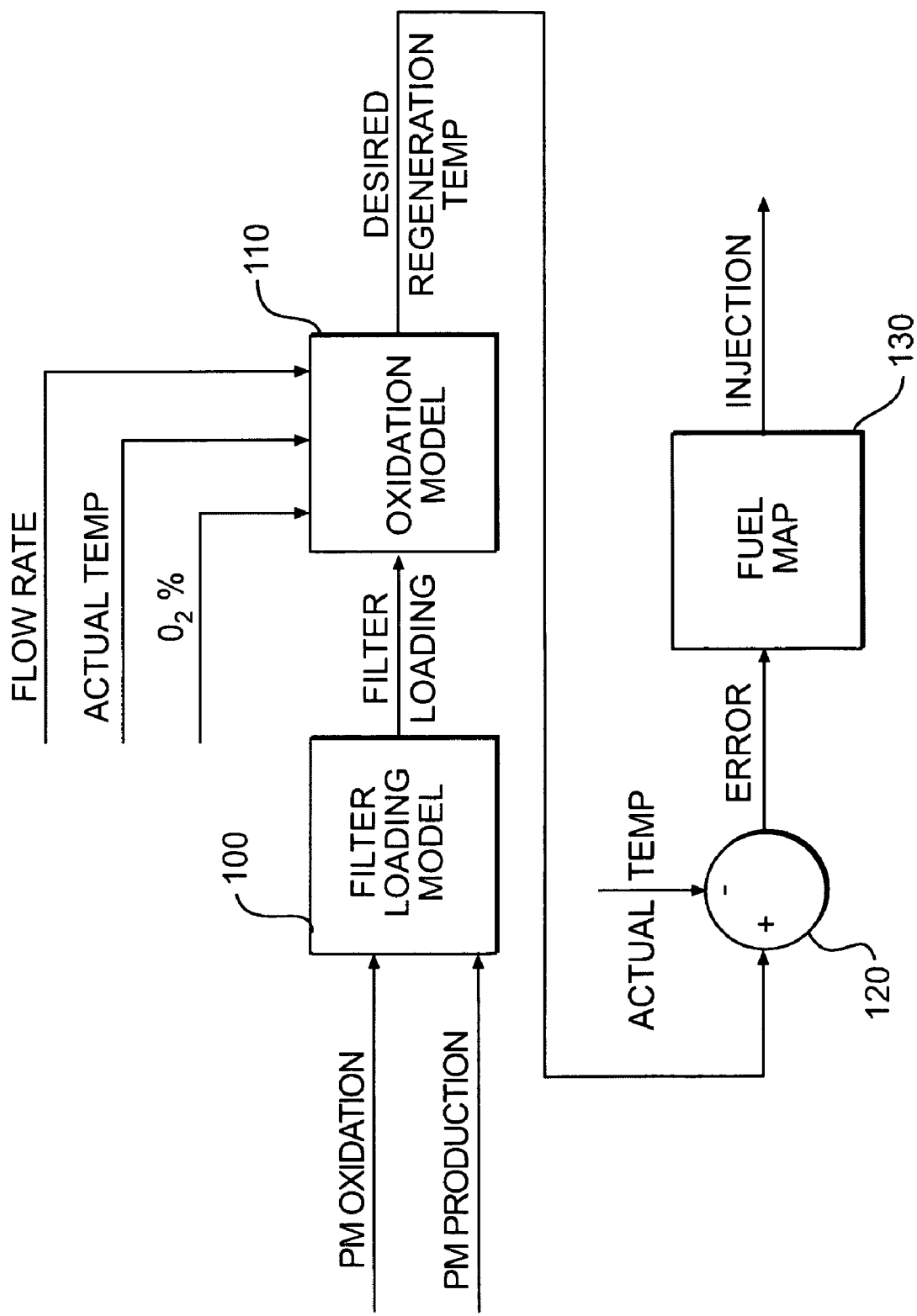
FIG. 2 is a control diagram of an exemplary disclosed method performed by the power system of FIG. 1.

FIG. 2 illustrates an exemplary method performed by controller 30. FIG. 2 will be discussed in more detail in the following section to further illustrate the disclosed concepts.

Industrial Applicability

The disclosed exhaust system may be applicable to any combustion engine where pollution control, efficiency, and system durability are important. The disclosed system may provide for particulate reduction during engine operation by collecting particulate matter from the engine's exhaust flow, and selectively executing a regeneration strategy to reduce the collected matter. The disclosed system may improve efficiency and durability by executing the regeneration strategy to reduce the particulate matter as quickly as possible, without exceeding thermal limits of the system. This regeneration strategy will now be described.

As shown in FIG. 2, the strategy may begin at startup of power system 10 with the monitoring of particulate loading within treatment device 18 by first sensor 26 (Control Block 100). As described above, first sensor 26 may account for both the instantaneous production of particulate matter of power system and the instantaneous reduction of particulate matter through regeneration to provide an accurate estimate of the amount of particulate matter within treatment device 18 at any given time. Once the amount of particulate matter within treatment device 18 has exceeded a first threshold level, regeneration may begin. And, once the amount of particulate matter within treatment device 18 is reduced below a second threshold level, regeneration may end.

During regeneration, the particulate loading information from first sensor 26 may be input to the oxidation model stored within the memory of controller 30 (Control Block 110). Controller 30 may reference the oxidation model to determine the desired regeneration exhaust temperature (i.e., the temperature of the exhaust entering treatment device 18 during regeneration) affected by heating device 22. The desired regeneration exhaust temperature may promote combustion of the particulate matter trapped within treatment device 18 at a distribution and a maximum temperature that are less than the thermal limits of treatment device 18 (i.e., less than about 200-300° C./cm and 900° C., respectively).

After determining the desired regeneration exhaust temperature, controller 30 may determine a difference between the desired regeneration exhaust temperature and the actual exhaust temperature measured or estimated by second sensor 28 (Control Block 120). Based on this difference, controller 30 may reference an operational map associated with heating device 22 to determine an adjustment (i.e., a fuel injection amount, fuel injection timing, number of injections, fuel injection pressure, fuel injection profile, etc.) to the operation thereof that minimizes the difference (Control Block 130). Controller 30 may continuously adjust operation of heating device 22 in an amount generally proportional to the amount of particulate matter within treatment device 18 during regeneration of treatment device 18 such that the associated regeneration duration may be minimized, without causing damage to the filtration medium of treatment device 18. That is, controller 30 may continuously cycle through control blocks 100-130, determining soot loading of treatment device 18, determining a desired regeneration temperature, determining an error value as a function of the desired and actual temperatures, and adjusting the temperatures as necessary to ensure optimal operation of power system 10.

Because controller 30 may continuously and/or proportionally adjust operation of heating device 22 during regeneration of treatment device 18, the time and energy required to fully regenerate treatment device 18 may be reduced. That is, because the amount of energy added to the exhaust flowing through treatment device 18 can be continuously adjusted according to an amount of particulate matter remaining within treatment device 18 at any give time and according to a worst case oxygen concentration, the heating rate and temperature during regeneration may be maximized, while still protecting the components of exhaust system 16 during regeneration. By maximizing the heating rate and the resulting combustion temperature during regeneration, the duration and amount of energy required to complete regeneration may be minimized. In addition, because regeneration control may be completely independent of engine operation (i.e., the heating and oxygen concentration utilized during regeneration may not affect engine operation), engine operation may not be adversely affected during a regeneration event.

It will be apparent to those skilled in the art that various modifications and variations can be made to the disclosed exhaust system without departing from the scope of the disclosure. Other embodiments of the exhaust system will be apparent to those skilled in the art from consideration of the specification and practice of the exhaust system disclosed herein. It is intended that the specification and examples be considered as exemplary only, with a true scope of the disclosure being indicated by the following claims and their equivalents.

What is claimed is:

1. An exhaust system for use with a combustion engine, comprising:
   an exhaust passage configured to receive a flow of exhaust from the combustion engine;
   a particulate filter located within the exhaust passage;
   a heating device located to selectively heat the flow of exhaust passing through the particulate filter; and
   a controller in communication with the combustion engine and the heating device, the controller being configured to:
   continuously determine an amount of particulate matter within the particulate filter;
   reference an oxidation model to continuously determine a desired regeneration temperature based on the amount of particulate matter determined and a sensed amount of oxygen;
   continuously determine an error value as a function of the desired regeneration temperature and an actual regeneration temperature; and
   adjust an amount of heating provided by the heating device based on the error value.

2. The exhaust system of claim 1, wherein:
   the controller is further configured to predict a maximum amount of oxygen possible within the flow of exhaust during operation of the heating device; and
   the controller is configured to continuously adjust the amount of heating provided by the heating device based further on a probability of the maximum amount of oxygen occurring.

3. The exhaust system of claim 1, wherein:
   the controller is configured to determine a particulate matter production rate of the combustion engine and a regeneration rate of the particulate filter; and
   the controller is configured to determine the amount of particulate matter within the particulate filter based on the production rate and the regeneration rate.

4. The exhaust system of claim 1, wherein the controller is configured to adjust an amount of heating provided by the heating device such that the heating of the particulate filter is maintained below a heating limit.

5. The exhaust system of claim 4, wherein the heating device is a fuel-fired burner located within the exhaust passage upstream of the particulate filter and the amount of heating is adjusted by adjusting an air-to-fuel ratio of the fuel-fired burner.

6. The exhaust system of claim 4, wherein the heating limit is a distribution of heating.

7. The exhaust system of claim 6, wherein the distribution of heating is 200° C./cm.

8. The exhaust system of claim 4, wherein the heating limit is a maximum temperature of the particulate filter.

9. The exhaust system of claim 8, wherein the maximum temperature is 900° C.

10. The exhaust system of claim 4, wherein the controller is configured to adjust the amount of heating to minimize a regeneration duration.

11. The exhaust system of claim 1, wherein operation of the heating device is independent of operation of the combustion engine.

12. A method of treating exhaust from a combustion engine, comprising:
    collecting particulate matter from the exhaust;
    heating the collected particulate matter to initiate combustion of the particulate matter;
    continuously determining an amount of remaining particulate matter;
    referencing an oxidation model to continuously determine a desired combustion temperature based on the determined amount of remaining particulate matter and a sensed amount of oxygen;
    continuously determining an error value as a function of the desired combustion temperature and an actual combustion temperature; and
    adjusting the heating of the collected particulate matter based on the error value.

13. The method of claim 12, further including predicting a maximum amount of oxygen possible within the exhaust during the heating, wherein the heating of the collected particulate matter is adjusted based further on the predicted maximum amount of oxygen.

14. The method of claim 12, wherein continuously determining the amount of remaining particulate matter includes continuously determining a particulate matter production rate of the combustion engine and a combustion rate of the particulate matter.

15. The method of claim 12, wherein the heating is adjusted such that thermal parameters of the combusting particulate matter are maintained below a heating limit.

16. The method of claim 15, wherein the heating limit is a distribution of heating of 200-300° C./cm.

17. The method of claim 15, wherein the heating limit is a maximum temperature of 900° C.

18. The method of claim 15, wherein the heating is adjusted to minimize a regeneration duration.

19. The method of claim 12, wherein heating the collected particulate matter includes injecting fuel into the exhaust and igniting the injected fuel.

20. A power system, comprising:
    an engine configured to combust fuel and generate a flow of exhaust;

an exhaust passage configured to receive the flow of exhaust from the engine;

a particulate filter located within the exhaust passage;

a fuel-fired burner located to selectively warm particulate matter collected within the particulate filter; and a controller in communication with the engine and the fuel-fired burner, the controller being configured to:

continuously determine an amount of particulate matter within the particulate filter;

continuously predict a maximum amount of oxygen possible with the flow of exhaust during operation of the fuel-fired burner;

continuously determine a desired regeneration temperature based on the amount of particulate matter and the maximum amount of oxygen possible within the flow of exhaust;

continuously determine an error value as a function of the desired regeneration temperature and an actual regeneration temperature; and adjust an amount of warming provided by the heating device based on the error value such that a regeneration duration is minimized, a distribution of particulate filter heating is maintained less than 200-300° C./cm, and a regeneration temperature is maintained less than 900° C.

* * * * *